United States Patent
Henning et al.

(10) Patent No.: US 11,634,531 B2
(45) Date of Patent: *Apr. 25, 2023

(54) CURABLE POLYFARNESENE-BASED COMPOSITIONS

(71) Applicant: FINA TECHNOLOGY, INC., Houston, TX (US)

(72) Inventors: Steven K. Henning, Downingtown, PA (US); Nan Tian, Wilmington, DE (US); Herbert Chao, Paoli, PA (US)

(73) Assignee: FINA TECHNOLOGY, INC., Houston, TX (US)

( * ) Notice: Subject to any disclaimer, the term of this patent is extended or adjusted under 35 U.S.C. 154(b) by 1 day.

This patent is subject to a terminal disclaimer.

(21) Appl. No.: 16/068,619

(22) PCT Filed: Aug. 11, 2016

(86) PCT No.: PCT/US2016/046519
§ 371 (c)(1),
(2) Date: Jul. 6, 2018

(87) PCT Pub. No.: WO2017/065864
PCT Pub. Date: Apr. 20, 2017

(65) Prior Publication Data
US 2019/0016847 A1    Jan. 17, 2019

Related U.S. Application Data

(63) Continuation of application No. 14/989,140, filed on Jan. 6, 2016, now Pat. No. 9,994,669.

(51) Int. Cl.
| | | |
|---|---|---|
| C08G 18/62 | (2006.01) | |
| C08F 36/22 | (2006.01) | |
| C08G 18/69 | (2006.01) | |
| C08G 18/32 | (2006.01) | |
| C08G 18/65 | (2006.01) | |
| C08G 18/76 | (2006.01) | |
| C09K 3/10 | (2006.01) | |
| C09D 175/14 | (2006.01) | |
| C09D 13/00 | (2006.01) | |
| C09J 175/14 | (2006.01) | |
| C08F 136/22 | (2006.01) | |
| C08F 236/22 | (2006.01) | |
| C08G 18/12 | (2006.01) | |
| C08G 101/00 | (2006.01) | |

(52) U.S. Cl.
CPC .......... C08G 18/6204 (2013.01); C08F 36/22 (2013.01); C08F 136/22 (2013.01); C08F 236/22 (2013.01); C08G 18/12 (2013.01); C08G 18/3206 (2013.01); C08G 18/6208 (2013.01); C08G 18/6588 (2013.01); C08G 18/69 (2013.01); C08G 18/698 (2013.01); C08G 18/7671 (2013.01); C09D 13/00 (2013.01); C09D 175/14 (2013.01); C09J 175/14 (2013.01); C09K 3/1021 (2013.01); C08F 2810/40 (2013.01); C08G 2101/00 (2013.01); C08G 2150/00 (2013.01); C08G 2170/00 (2013.01)

(58) Field of Classification Search
None
See application file for complete search history.

(56) References Cited

U.S. PATENT DOCUMENTS

| | | | |
|---|---|---|---|
| 3,258,450 A | 6/1966 | Aronoff et al. | |
| 3,629,175 A * | 12/1971 | Moore et al. | ........ C09D 5/4403 |
| | | | 524/383 |
| 4,063,002 A | 12/1977 | Wilson et al. | |
| 5,589,543 A | 12/1996 | Yokelson et al. | |
| 5,925,724 A | 7/1999 | Cenens et al. | |
| 6,060,560 A | 5/2000 | St. Clair | |

(Continued)

FOREIGN PATENT DOCUMENTS

| | | |
|---|---|---|
| CA | 2888668 A1 | 9/2014 |
| CN | 1167735 C | 9/2004 |

(Continued)

OTHER PUBLICATIONS

Bae et al., "A Novel Mechanism of Exfoliation and Physical Properties of PU/Organoclay Nanocomposites", Journal of Applied Polymer Science, 2013, pp. 3089-3095, vol. 129(6).

Carrado et al., "Acid Activation of Bentonites and Polymer-Clay Nanocomposites", Elements, vol. 5 , Apr. 2009, pp. 111-116.

Chen et al., "Exfoliation of Organo-Clay in Telechelic Liquid Polybutadiene Rubber", Macromolecules 2005, vol. vol. 38, No. 9, pp. 4030-4033.

(Continued)

*Primary Examiner* — Tae H Yoon
(74) *Attorney, Agent, or Firm* — Albert Shung

(57) ABSTRACT

A polymer having a hydrophobic polymer chain derived from monomers of farnesene and other optional monomers, such as dienes and vinyl aromatics. The polymer also includes one or more terminal functional groups, such as an amino group, a glycidyl group, a carboxylic acid group, a (meth)acrylate group, a silane group, an isocyanate group, an acetoacetate group, a phenolic group, and a hydroxyl group. Functional groups, such as carboxylic acids, may also be grafted along the hydrophobic polymer chain. The polymer may be incorporated in curable compositions that optionally include one or more polymer resins having similar functional groups. Methods for preparing the curable polymer compositions are also provided. The curable or cured form of the polymer composition may be used in various products, such as a sealant, a coating, a caulk, an electric potting compound, a membrane, a sponge, a foam, an adhesive, or a propellant binder.

8 Claims, No Drawings

(56) References Cited

U.S. PATENT DOCUMENTS

| | | | |
|---|---|---|---|
| 6,211,324 B1 | 4/2001 | Haider et al. | |
| 6,780,957 B1 | 8/2004 | Haider et al. | |
| 7,001,952 B2* | 2/2006 | Faler | C08G 18/4854 |
| | | | 525/185 |
| 7,655,739 B1* | 2/2010 | McPhee | A61L 15/58 |
| | | | 526/72 |
| 7,687,121 B2 | 3/2010 | Landon et al. | |
| 7,807,756 B2 | 10/2010 | Wakabayashi et al. | |
| 8,048,976 B2 | 11/2011 | McPhee | |
| 8,257,805 B2 | 9/2012 | Landon et al. | |
| 8,580,361 B2 | 11/2013 | Landon | |
| 8,592,543 B2 | 11/2013 | McPhee et al. | |
| 8,597,741 B2 | 12/2013 | Landon et al. | |
| 8,846,587 B2 | 9/2014 | DiBaise et al. | |
| 9,850,329 B2* | 12/2017 | Yoo | G06F 3/0412 |
| 9,994,669 B2 | 6/2018 | Tian et al. | |
| 10,040,877 B2* | 8/2018 | Washizu | C08F 36/08 |
| 10,239,973 B2 | 3/2019 | Yoo et al. | |
| 10,323,117 B2 | 6/2019 | Tian et al. | |
| 10,336,839 B2 | 7/2019 | Yoo et al. | |
| 10,544,241 B2* | 1/2020 | Henning | C08F 36/22 |
| 2004/0158003 A1 | 8/2004 | Ruckel et al. | |
| 2006/0199922 A1* | 9/2006 | Pawlow | C08L 21/00 |
| | | | 525/445 |
| 2007/0173597 A1 | 7/2007 | Williams et al. | |
| 2007/0178256 A1 | 8/2007 | Landon | |
| 2011/0151154 A1 | 6/2011 | Landon | |
| 2012/0165474 A1* | 6/2012 | Mcphee | C08L 23/02 |
| | | | 525/314 |
| 2012/0253001 A1 | 10/2012 | Radhakrishnan et al. | |
| 2013/0022404 A1 | 1/2013 | Stinson | |
| 2013/0078397 A1 | 3/2013 | Chao et al. | |
| 2013/0123379 A1 | 5/2013 | Mcphee | |
| 2014/0378570 A1 | 12/2014 | Tabor et al. | |
| 2015/0057392 A1 | 2/2015 | Koda et al. | |
| 2015/0057403 A1 | 2/2015 | Koda et al. | |
| 2015/0218428 A1 | 8/2015 | Krishnan et al. | |
| 2015/0284656 A1 | 10/2015 | Uehara et al. | |
| 2016/0272750 A1 | 9/2016 | Voci et al. | |
| 2016/0376386 A1 | 12/2016 | Yoo et al. | |
| 2017/0190829 A1 | 7/2017 | Tian et al. | |
| 2018/0282524 A1 | 10/2018 | Chao et al. | |

FOREIGN PATENT DOCUMENTS

| | | |
|---|---|---|
| CN | 101056945 A | 10/2007 |
| CN | 102164974 A | 8/2011 |
| CN | 103052664 A | 4/2013 |
| CN | 103748122 A | 4/2014 |
| CN | 104704090 A | 6/2015 |
| CN | 105121482 A | 12/2015 |
| EP | 1279687 A2 | 1/2003 |
| EP | 2601229 B1 | 6/2013 |
| EP | 2899255 A1 | 7/2015 |
| JP | S59227915 A | 12/1984 |
| JP | S62012746 A | 1/1987 |
| JP | 2007291378 A | 11/2007 |
| JP | 2014208796 A | 11/2014 |
| KR | 20150135305 A | 12/2015 |
| WO | 2007089699 A2 | 8/2007 |
| WO | 2012018682 A1 | 2/2012 |
| WO | 2014142001 A1 | 9/2014 |
| WO | 2014157624 A1 | 10/2014 |

OTHER PUBLICATIONS

Cray Valley Products for Urethane Elastomers Hydroxyl Terminated Functional Liquid Poly bd Resins, 24 pages (2011).
Final Office Action for U.S. Appl. No. 14/989,140, dated Nov. 14, 2017, 15 pages.
International Preliminary Report on Patentability for International Application No. PCT/US2016/046519, dated Jul. 10, 2018, 12 pages.
International Search Report and Written Opinion for International Application No. PCT/US2016/046519, dated May 17, 2017, 20 pages.
International Search Report and Written Opinion for International Application No. PCT/US2018/024525, dated Jul. 4, 2018, 13 pages.
Invitation to Pay Additional Fees for International Application No. PCT/US2016/046519, dated Nov. 11, 2016, 10 pages.
Non Final Office Action for U.S. Appl. No. 14/989,140, dated May 2, 2017, 15 pages.
Ruth et al., "Dispersion of Nanoclays in Urethane Monomers," Polymer Preprints 2009, vol. 50, No. 2, pp. 528, (Proceedings Published 2010 by the American Chemical Society).
Sun et al., "Rubber/exfoliated-clay Nanocomposite Gel: Direct Exfoliation of Montmorillonite by Telechelic Liquid Rubber," Chinese Science Bulletin 2004, vol. 49, No. 15, pp. 1664-1666.
Wang et al., "Enhanced Exfoliation of Organoclay in Partially End-Functionalized Non-Polar Polymer", Macromolecule Materials and Engineering, 2009, vol. 294, pp. 190-195.
Zhu et al., "Studies on Polybutadiene / MMT Nanocomposites," China Academic Journal Electronic Publishing House, 2010, vol. 38, No. 5, pp. 166-168.
Zhu et al., "Study on Clay Dispersion and Confinement in Polybutadiene/ clay Nonocomposites," College of Chemistry and Chemical Engineering, 2011, vol. 52, No. 5, pp. 273-276.
Non Final Office Action for U.S. Appl. No. 15/477,699, dated Sep. 13, 2018, 36 pages.
International Preliminary Report on Patentability and Written Opinion for International Application No. PCT/US2018/024525, dated Oct. 8, 2019, 7 pages.
Informal Translation of the Preliminary Office Action for Brazilian Application No. BR112018013738-3, dated Feb. 28, 2020, 5 pages.
Taiwan Office Action with Search Report for Taiwan Application No. 105129517, dated Apr. 23. 2020, 4 pages.
Chinese Office Action for Chinese Application No. 201680078219. 0, dated Apr. 24, 2020, with translation, 15 pages.
Notice of Reasons for Rejection for Japanese Application No. 2018-535140, dated Apr. 22, 2020, with translation, 5 pages.
Japanese Notice of Reasons for Rejection for Japanese Application No. 2018-535140, dated Nov. 10, 2020 with translation, 5 pages.
Taiwan Office Action for Taiwan Application No. 105129517, dated Nov. 30, 2020 with partial translation, 5 pages.
Chinese Office Action for Chinese Application No. 201680078219.0 dated Dec. 10, 2020 with partial translation, 4 pages.
Japanese Notice of Reasons for Rejection for Japanese Application No. 2018-535140, dated May 18, 2021 with translation, 8 pages.
Notice of Allowance for U.S. Appl. No. 16/692,543, dated Jun. 2, 2022, 13 pages.
Chinese Office Action for Chinese Application No. 202010972753. 4, dated Nov. 25, 2022 with translation, 19 pages.
Chinese Office Action for Chinese Application No. 202010974654. X, dated Nov. 25, 2022 with translation, 18 pages.

* cited by examiner

CURABLE POLYFARNESENE-BASED COMPOSITIONS

CROSS-REFERENCE TO RELATED APPLICATIONS

This application is the United States national phase of International Application No. PCT/US2016/046519, filed 11 Aug. 2016, which is related to, and claims the benefit of priority of, Non-Provisional U.S. application Ser. No. 14/989,140, entitled POLYOLS DERIVED FROM FARNESENE FOR POLYURETHANES, filed on 6 Jan. 2016, now U.S. Pat. No. 9,994,669, the contents of both of which are incorporated herein by reference in their entirety for all purposes.

TECHNICAL FIELD

The present subject matter relates to hydrophobic curable polymer systems that may be used as insulating glass sealants, electric potting compounds, construction coating/sealants, and water membranes, for example. More specifically, the invention relates to curable polymers systems, such as polyurethane resins and their compositions, that include polymers derived from farnesene.

BACKGROUND

Hydrophobic polymer compositions are commonly based on polybutadiene polyols or silicone polymers. These polymers, even at low molecular weight, have relatively high viscosities, which make formulating curable encapsulants with good flow characteristics or curable coating formulations that can be spray-applied difficult. Common methods employed to lower the viscosity of the formulations unfortunately result in compositions having lowered hydrophobicity in addition to other drawbacks. For example, to achieve low formulation viscosity, plasticizers such as oils and other low molecular weight non-functional additives may be used in certain curable polymer compositions. These additives can modify the rheology of the formulation, but may also lead to reduced cure times and inferior tensile properties, among others.

Thus, there is a need for improved curable polymer systems having relatively low viscosity for easier application that are hydrophobic for moisture-sensitive applications.

SUMMARY

According to one embodiment, a homopolymer or copolymer having a hydrophobic polymer chain derived from monomers of farnesene and at least one terminal functional group is provided. The at least one terminal functional group may be an amino group, a glycidyl group, a carboxylic acid group, a (meth)acrylate group, a silane group, an isocyanate group, an acetoacetate group, a phenolic group, or a hydroxyl group. Comonomers may include one or more of dienes and vinyl aromatics. Functional groups, such as carboxylic acids, may also be grafted along the hydrophobic polymer chain (i.e., the functional groups may be pendant to the backbone of the polymer chain).

According to another embodiment, the homopolymer or copolymer having a hydrophobic polymer chain derived from monomers of farnesene and at least one terminal functional group may be incorporated in curable compositions. Also included in the curable compositions may be one or more polymer resins having similar functional groups.

According to yet another embodiment, methods for preparing curable polymer compositions comprising a hydrophobic farnesene-based polymer are disclosed herein. An elastomeric product is also provided comprising the curable or cured form of the polymer composition that may be in the form of a sealant, a coating, a caulk, an electric potting compound, a membrane, a sponge, a foam, an adhesive, or a propellant binder.

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

DETAILED DESCRIPTION

According to the examples disclosed herein, functionalized farnesene-based polymers are provided that are capable of forming hydrophobic gel compositions, but the uncured compositions have much lower viscosity when compared to hydrophobic gel compositions based on polybutadienes, silicone polymers, and the like. The farnesene-based polymers can be further reacted to form a derivative that can be then reacted with or without monomeric additives with complementary reaction groups to form stable hydrophobic gels from formulations with inherently low uncured viscosity. Alternatively, polymerization terminating or chain transfer agents can be selected to yield a farnesene-based homopolymer or copolymer quantitatively terminated with a reactive functional group.

Because of the lower inherent polymer viscosity of the hydrophobic gel compositions disclosed herein, formulations can also include higher levels of fillers or extenders and still be easily applied, for example, by coating or spray applications. The farnesene-based reactive polymer can be used as the exclusive reactive polymer or blended into other reactive polymer systems in order to reduce the viscosity of a blended reactive polymer system. Examples of suitable derivative reactive groups which may be used to functionalize the farnesene-based polymers and provide curable compositions include carboxylic acid groups, amine groups, epoxy groups, phenol groups, cyanate ester groups, anhydride groups, and isocyanate groups, as described in greater detail below.

In several of the proposed preparation methods for the curable compositions described below, a hydroxy-terminated polyfarnesene-based polymer is first obtained. The hydroxy-terminated polyfarnesene-based polymers according to the disclosed methods and compositions exhibit lower viscosities compared to polydiene-based polymers, such as polybutadiene-based monols or polyols, of similar molecular weight. Therefore, hydroxy-terminated polyfarnesene-based polymers may be handled favorably without significant dilution with other components. In addition, the hydroxy-terminated polyfarnesene-based polymers can be combined with oligomers based on hydroxy-terminated polybutadiene and polyisoprene, for example, to provide monol and polyol mixtures that may be combined to form curable compositions. The viscosity of polyfarnesene may be controlled by copolymerization with other monomers, such as dienes and vinyl aromatics. Examples include butadiene, isoprene, and styrene. The resulting polyurethanes derived from hydroxy-terminated polyfarnesene polymers, having excellent hydrophobicity, are excellent in a variety of applications, such as insulating glass sealants, caulks, adhesives, electric potting compounds, construction coating/sealants, water-proofing membranes, sponges, foams, adhesives, coatings, propellant binders, encapsulating compounds, as well as other rubber-fabricated materials.

The hydroxy-terminated polyfarnesene-based polymer may be obtained by polymerizing a monomer feed that primarily includes farnesene followed by hydroxyl-functionalization of the terminal end(s) of the polymer. As used herein "polyol" is an organic compound having more than one hydroxyl group. In one example, the polyol has an average OH-functionality greater than or equal to 1.9. In another one example, each end of the polymer bears a hydroxyl group. In yet another example, hydroxyl groups are present only at a plurality of ends, but fewer than all of the ends, of the polymer chain. The farnesene-based polymers have a lower viscosity compared to polybutadienes, but comparable hydrophobicity. Therefore, the polyols may be used to manufacture polyurethanes used in moisture sensitive coating applications, for example, without significant dilution with other additives for the purpose of lowering the viscosity of the polyols.

Any methods known by those having skill in the art may be used to polymerize the farnesene monomers. Anionic polymerization may be desirable because anionic polymerization allows greater control over the final molecular weight of the polymer. The living terminal ends of the polymer may also be easily quenched using an epoxide followed by contact with a protic source providing a polyol. The low viscosity farnesene-based polymers may be derived by polymerizing farnesene monomer alone or with at least one other monomer, such as butadiene or isoprene, for example. It is preferred that the polymers made according to various embodiments of the disclosed methods and compositions are derived from a monomer feed that is primarily composed of farnesene (e.g., at least 50% by weight farnesene).

Farnesene exists in isomer forms, such as α-farnesene ((E,E)-3,7,11-trimethyl-1,3,6,10-dodecatetraene) and β-farnesene (7,11-dimethyl-3-methylene-1,6,10-dodecatriene). As used in the specification and in the claims, "farnesene" means (E)-β-farnesene having the following structure:

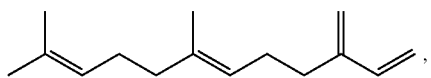

as well as (E)-β-farnesene in which one or more hydrogen atoms have been replaced by another atom or group of atoms (i.e. substituted).

The farnesene monomer used to produce various embodiments of the polymer according to the disclosed methods and compositions may be prepared by chemical synthesis from petroleum resources, extracted from insects, such as Aphididae, or plants. Therefore, an advantage of the disclosed methods and compositions is that the polymer may be derived from a monomer obtained via a renewable resource. The monomer may be prepared by culturing a microorganism using a carbon source derived from a saccharide. The farnesene-based polymer according to the disclosed methods and compositions may be efficiently prepared from the farnesene monomer obtained via these sources.

The saccharide used may be any of monosaccharides, disaccharides, and polysaccharides, or may be a combination thereof. Examples of monosaccharides include, without limitation, glucose, galactose, mannose, fructose, and ribose. Examples of disaccharides include, without limitation, sucrose, lactose, maltose, trehalose, and cellobiose. Examples of polysaccharides include, without limitation, starch, glycogen, and cellulose.

The cultured microorganism that consumes the carbon source may be any microorganism capable of producing farnesene through culturing. Examples thereof include eukaryotes, bacteria, and archaeabacteria. Examples of eukaryotes include yeast and plants. The microorganism may be a transformant obtained by introducing a foreign gene into a host microorganism. The foreign gene is not particularly limited, and may be a foreign gene involved in the production of farnesene because it can improve the efficiency of producing farnesene.

In the case of recovering farnesene from the cultured microorganism, the microorganism may be collected by centrifugation and disrupted, and then farnesene can be extracted from the disrupted solution with a solvent. Such solvent extraction may appropriately be combined with any known purification process such as distillation.

The farnesene-based polymers described herein may be prepared by a continuous solution polymerization process wherein an initiator, monomers, and a suitable solvent are continuously added to a reactor vessel to form the desired homopolymer or co-polymer. Alternatively, the farnesene-based polymers may be prepared by a batch process in which all of the initiator, monomers, and solvent are combined in the reactor together substantially simultaneously. Alternatively, the farnesene-based polymers may be prepared by a semi-batch process in which all of the initiator and solvent are combined in the reactor together before a monomer feed is continuously metered into the reactor.

Preferred initiators for providing a polymer with living terminal chain ends include, but are not limited to, organic salts of alkali metals. The polymerization reaction temperature of the mixture in the reactor vessel may be maintained at a temperature of about −80 to 80° C.

As understood by those having skill in the art, anionic polymerization may continue, as long as monomer is fed to the reaction. The polyfarnesene-based polyols may be obtained by polymerization of farnesene and one or more comonomers. Examples of comonomers include, but are not limited to, dienes, such as butadiene, isoprene, and myrcene, or vinyl aromatics, such as styrene and alpha methyl styrene, in which butadiene, isoprene, and styrene are preferred. In one embodiment of the disclosed methods and compositions, a method of manufacturing a polyfarnesene-based polyol may comprise polymerizing a monomer feed, wherein the monomer feed comprises farnesene monomer and at least one comonomer in which the comonomer content of the monomer feed is ≤75 mol. %, alternatively ≤50 mol. %, or alternatively ≤25 mol. %, based on the total moles of the monomer in the monomer feed. Examples of comonomers include, but are not limited to, dienes, vinyl aromatics, and combinations thereof. The polymerization conditions and monomer feed may be controlled as may be desired so as to provide, for example, copolymers having a random, block or gradient structure.

The hydroxy functionalized low viscosity farnesene-based homo-polymers or copolymers according to embodiments of the disclosed methods and compositions may have a number average molecular weight greater than or equal to 1,000 g/mol and less than or equal to 100,000 g/mol, alternatively less than or equal to 25,000 g/mol, as measured through a gel permeation chromatograph and converted using polystyrene calibration. The weight of the polyol can be from about 0.5 wt. % to about 99.5 wt. % of the resulting polyurethane. The farnesene-based homopolymers or copolymers may have a viscosity less than or equal to 100,000 cP, alternatively less than 50,000 cP, or alternatively less than or equal to 25,000 cP, at 25° C.

The quenching step to end polymerization is accomplished by reacting the living terminal end(s) of the living polymer with an alkylene oxide, such as propylene oxide, and a protic source, such as an acid, resulting in a diol or polyol, i.e. a hydroxyl group on each of the terminal ends of the polymer.

Following polymerization, the hydroxyl-terminated polymer may be hydrogenated to decrease the degree of unsaturation of the polymer less than or equal to 50%, alternatively less than or equal to 10%. The degree of unsaturation is equal to the ratio of the Iodine value after hydrogenation to the original Iodine value of the polymer prior to hydrogenation. Hydrogenation of the hydroxyl-terminated polymer will modify the glass transition temperature (Tg) of the polymer and improve the thermostability and UV-stability of the polymer. Hydrogenation may be carried out by a variety of processes familiar to those of ordinary skill in the art including, but not limited to, hydrogenation in the presence of catalysts, such as Raney Nickel, nobel metals, soluble transition metal catalysts, and titanium catalysts, for example. Degree of unsaturation is determined by analytical methods known in the art, such as iodine value.

Various methods of providing a curable composition comprising a farnesene-based polymer, such as the polyols described above, are described in the following sections.

I. Amino-Termination

In one example, a curable composition polymer may be provided by first reacting one or more polyols, wherein at least one polyol is a polyfarnesene based polyol, with an alkane- or arenesulfonyl chloride or fluoride in the presence of a tertiary amine catalyst to form an alkane- or arenesulfonate terminated polymer. The alkane- or arenesulfonate terminated polymer may then be reacted with a primary amine or ammonia to provide the curable polymers, which include amine-terminated polyfarnesene.

Typical alkane- or arenesulfonyl compounds that may be reacted with the polyols include, but are not limited to, methanesulfonyl chloride, methane sulfonyl fluoride, ethanesulfonyl chloride, ethanesulfonyl fluoride, p-toluenesulfonyl chloride, and p-toluenesulfonyl fluoride. Primary amines that may be reacted with the alkane- or arenesulfonate terminated polymer include, for example, ethyl amine, propylamines, allylamine, n-amylamine, butylamines, cyclohexylamine, n-tetradecylamine, benzylamine, aniline, toluidines, naphthylamine and the like.

In an alternative method, a polyol, such as a polyfarnesene-based polyol, may be directly reacted with ammonia. For example, as explained above, the polyfarnesene-based polyol may be provided by anionic polymerization of farnesene monomers in which the living terminal ends of the polymer are quenched using an epoxide followed by contact with a protic source providing a polyol. If the epoxide used is an alkylene oxide in which the alkyl group is a C1-C20 alkyl group, the resulting polyol will be a secondary alcohol. The secondary hydroxyl-groups may then be reacted directly with ammonia in the presence of hydrogen and a catalyst under pressure (e.g. >2 MPa) to provide amine-terminated polymers. A stoichiometric excess of ammonia with respect to the hydroxyl groups may be used. Examples of catalysts for the amination include, but are not limited to, copper, cobalt and/or nickel, and metal oxides. Suitable metal oxides include, but are not limited to, $Cr_2O_3$, $Fe_2O_3$ $ZrO_2$, $Al_2O_3$, and ZnO.

In yet another example, the amino-terminated polyfarnesene and oligomer blends may be obtained by adding acrylonitrile to either a primary or secondary OH end of a polyol through Michael addition, followed by reduction to form a primary amino group at a terminal end. For example in one method, a polyfarnesene-based polyol or blend of polyols may be dissolved in an organic solvent and mixed with a base to catalyze the reaction. Examples of bases include, but are not limited to, alkali metal hydroxides and alkoxides, such as sodium hydroxide. Acyrlonitrile may then be added to the catalyst/polyol mixture dropwise. The Michael addition of acrylonitrile (cyanoethylation) to the polyol will form the corresponding cyanoalkylated compound. The cyanoalkylated compound may then be isolated and dissolved in an organic solvent and hydrogenated under temperature and/or pressure in the presence of anhydrous ammonia and a Group VIII metal or metal containing complex, such as Raney nickel or a cobalt catalyst.

As understood by one of skill in the art, the reactants may be dissolved in a suitable organic solvent and heat and/or pressure may be applied to the reaction to promote formation of the amine-terminated polyfarnesene. The reaction may be carried out batchwise or as a semicontinuous or continuous process. The reaction products may be recovered and treated by any conventional method, such as distillation, evaporation or fractionation to effect separation from unreacted material, solvent, if any, and by products. Partial or complete hydrogenation of the polyfarnesene chain or backbone may be carried out either before or after amination.

The amino-terminated polyfarnesenes or amino-terminated oligomer blends containing polyfarnesene may then be cured through a variety of mechanisms. For example, the amino-terminated polymers may be reacted with phosgene, diisocyanates or polyisocyanates, or urea to form polyureas. The difunctional amino-terminated polymers may also be used as a chain extender during the preparation of water-dispersible polyurethanes. Monofunctional amino-terminated polymers may be used as chain blocking agents or as grafting agents for modifying oligomers or polymers bearing end- or side-groups, like carboxyls or anhydrides or isocyanates, which can react with amine groups of other amino-terminated polymers. Specific block or grafted or star type controlled polymeric structures can be obtained by using these amino-terminated polymers.

According to other curing mechanisms, the amino-terminated polymers may react with epoxies, such as bisphenol A epoxy resins or cycloaliphatic diepoxides, to form covalent bonds with the epoxy matrix. Reacting amino-terminated polymers with dianhydrides may form polyamic acids or polyimides after dehydration. The amino-terminated polymers may be condensed with phenolic compounds via a Mannich-type reaction to serve as a flexibilizer and enhance the electric properties of the resulting phenolic resins.

The amino-terminated polymers may be used as the sole diamine, or in combination with other di- or polyamines in the aforementioned reactions and condensations.

II. Epoxy-Termination

Another method of providing a curable polyfarnesene includes first reacting one or more polyols containing a polyfarnesene-based polyol with a monoepoxy compound and followed by reaction with an alkali metal hydroxide to provide a glycidyl-terminated polyfarnesene.

In the first step, the polyol and the monoepoxy may be combined in a solvent and allowed to react under pressure or in the presence of an inert gas, such as nitrogen or a noble gas. Examples of monoepoxy compounds include epihalohydrins, such as epichlorohydrin, beta-methylepichlorohydrin and epibromohydrin. The reactants may be optionally mixed with a catalyst, such as a metal salt or semimetal salt, the metal being selected from boron, aluminium, zinc and tin, and at least one anion selected from $F^-$, $Cl^-$, $BF_4^-$, $PF_6^-$, $AsF_6^-$, $SbF_6^-$, $ClO_4^-$, $IO_4^-$, and $NO_3^-$.

Following the first step, excess monoepoxy compound may be removed by distillation, for example, and then at least one alkali metal hydroxide may be added to the reaction mixture in order to form an alkali metal halide and the glycidyl-terminated polymer.

The glycidyl-terminated polyfarnesenes, and mixtures thereof with other similarly functionalized oligomers, may then be cured through combination with a base and optionally at least one epoxy prepolymer which has two or more epoxy groups. Examples of epoxy prepolymers include, but are not limited to, polyepoxides based on bisphenol A diglycidyl ether, bisphenol F diglycidyl ether or cycloaliphatic types such as 3,4-epoxycyclohexylepoxyethane or 3,4-epoxycyclohexylmethyl 3,4-epoxycyclohexanecarboxylate. Any bases known to those of skill in the art for curing epoxies may be used with the glycidyl-terminated polyfarnesenes described above. Examples of bases include, but are not limited to, amine-containing compounds having at least two or more primary and/or secondary amino groups, e.g. diethylenetriamine, triethylenetetramine, methylenedianiline, bis(aminocyclohexyl)methane, 4,4'-diaminodicyclohexylmethane, tricyclododecanediamine, norbornanediamine, N-aminoethylpiperazine, isophoronediamine, m-phenylenebis(methylamine), 1,3- and/or 1,4-bis(aminomethyl)cyclohexane, trimethylhexamethylenediamine, polyoxyalkyleneamines, polyaminoamides, and reaction products of amines with acrylonitrile and Mannich bases, and also a polyamine selected from the group comprising isophoronediamine, diethylenetriamine, trimethylhexamethylenediamine, m-phenylenebis(methylamine), 1,3-bis(aminomethyl)-cyclohexane, methylenebis(4-aminocyclohexane), 3,3'-dimethyl-4,4'-diaminodicyclohexylmethane, N-aminoethylpiperazine, polyoxyalkyleneamines, polyaminoamides, reaction products of amines with acrylonitrile and Mannich bases.

III. Carboxylic Acid-Termination

The curable polyfarnesenes disclosed herein may also be provided in the form of a carboxylic acid-terminated polyfarnesene, which may be obtained by various methods.

In a first method, the carboxylic acid-terminated polyfarnesene may be obtained by modifying the polymerization process described above for obtaining the polyfarnesene-based polyol. Anionic polymerization of farnesene monomers may be used to provide a polyfarnesene chain having living terminal ends. However, instead of quenching the living terminal ends of the polymer with an epoxide, the living terminal ends may be contacted with carbon dioxide gas to provide the terminal ends with a carboxy group followed by quenching the living terminal ends with an acid, such as hydrochloric, phosphoric, or sulfuric acid to convert the carboxy groups into carboxylic acids. The carboxylic acid-terminated polyfarnesenes can be combined with other oligomers, such as polybutadiene and polyisoprene, that have been carboxylic-acid terminated according to a similar method as described above to provide a curable composition.

In another method, the carboxylic acid-terminated polyfarnesene may be obtained by reacting the polyfarnesene-based polyols with a cyclic anhydride. Examples of cyclic anhydrides include, but are not limited to, phthalic anhydride, succinic anhydride, maleic anhydride, trimellitic anhydride, hexahydrophthalic anhydride, chlorinated anhydrides such as chlorendic anhydride and tetrachlorophthalic anhydride, methyltetrahydrophthalic anhydride, itaconic anhydride, pyromellitic dianhydride, benzophenonetetracarboxylic dianhydride, and cyclopentanetetracarboxylic dianhydride.

In yet another method, a carboxylic acid-functional groups may be grafted along the polyfarnesene chain or backbone, such as the polyols described above, by partially saturating the double bonds of the polymer by means of thioglycolic acid or an ester thereof. The condensation of thioglycolic acid with the polymer double bonds can be effected either by contacting water-free thioglycolic acid with the polymer in an organic solvent, such as toluene, in the presence of air or peroxide catalysts, or the polymer can be reacted with esters of thioglycolic acid in the presence of oxidants to yield ester type adducts which can be converted to the desired acid derivative by hydrolysis.

The carboxylic acid-terminated polyfarnesenes may then be optionally blended with other oligomers having similar functionality and cross-linked by reaction with polycarbodiimides at room temperature.

IV. (Meth)Acrylate-Termination (Meth)acrylate-terminated polyfarnesene may be obtained by a variety of methods. For example, direct acrylation may be achieved by reacting the hydroxyl-terminal ends of the polyfarnesene-based polyols with (meth)acrylic acid, (meth)acrylic ester, or (meth)acrylic chloride to form the (meth)acrylate-terminated polyfarnesene. Alternatively, the polyfarnesene-based polyols may be reacted together, or sequentially, with an isocyanate-containing compound having an isocyanate functionality of two or more and a hydroxy-alkylacrylate, such as hydroxyethylacrylate. In yet another example, the carboxylic acid-terminated polyfarnesenes described above may be esterified by reaction with the epoxy groups of glycidyl (meth)acrylate resulting in (meth)acrylate terminal ends.

The (meth)acrylate-terminated polyfarnesenes may be incorporated in UV curable compositions by itself or blended with other (meth)acrylated oligomers.

V. Silylation

Curable farnesene-based polymers may also be provided via silylation. The silylated polyfarnesene may be obtained by a variety of methods.

In one method, the hydroxyl-terminal ends of the polyfarnesene-based polyols may be reacted with isocyanatopropyl triethoxylsilane to form a carbamate. The result is a polyfarnesene having silylated terminal ends.

In another method, the polyfarnesene-based polyols may be silylated according to a process comprising three steps.

First, the hydroxyl end groups of the polyfarnesene-based polyols are converted into metallic alkoxide groups using an alkali metal, such as Na or K, or an alkali metal containing compound. Examples of alkali metal containing compounds include, but are not limited to, a metallic hydride, such as NaH, a metallic alkoxide, such as NaOCH$_3$, and caustic alkalis, such as NaOH or KOH. The result is a polyfarnesene having terminal metallic alkoxide groups.

The metallic alkoxide groups may then be converted in a second step into olefinic ether groups by reacting the polyfarnesene having terminal metallic alkoxide groups with a organo-halogen compound according to the following formula (1):

$$CH_2=CH-R''-Y \tag{1}$$

wherein Y is a halogen atom selected from chlorine, bromine, and iodine; and R" is a divalent group selected from —CH$_2$—,

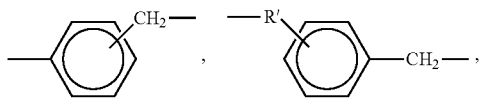

and —R'—OCH$_2$— (wherein R' is a divalent hydrocarbon group chosen from alkylene group, cycloalkylene group arylene group and aralkylene group). Examples of organo-halogen compounds include, but are not limited to, allyl chloride allyl bromide, vinyl-(chloromethyl)-benzene, allyl-(chloromethyl)-benzene, allyl-(bromomethyl)-benzene, allyl-(chloromethyl)-ether, allyl-(chloromethoxy)-benzene, 1-butenyl(chloromethyl)-ether, 1-hecenyl(chloromethoxy)-benzene.

In a final step, addition reaction of the olefinic ether groups with a silicon hydride according to formula (2) will provide a polyfarnesene-based polymer having terminal silyl ether groups:

$$X_{3-a}-SiH-R_a \tag{2}$$

wherein X is a group chosen from halogen group, alkoxy group, acyloxyl group, ketoximato group, amino group, amide group, aminoxy group, and mercaptide group, R is a monovalent hydrocarbon group, and a is 0, 1, or 2.

According to yet another method, the polyfarnesene-based polyols may be reacted with one or more isocyanate-group containing compounds having a functionality of at least 2, such as toluene diisocyanate (TDI), to form a diisocyanate prepolymer, removing any excess isocyanate-group containing compounds by distillation in vacuo, and finally reacting the diisocyanate prepolymer with aminopropyl triethoxysilane.

The silylated polyfarnesenes may be blended with other silylated oligomers and cured upon exposure to moisture and optionally in the presence or rare earth metal catalysts.

VI. Acetoacetylation

Curable farnesene-based polymers may also be provided by deriving acetoacetyl functionalized polymers from the polyfarnesene based polyols and blends thereof with other polyols. The terminal hydroxyl-groups of the polyols may be reacted with a stoichiometric amount of a diketene or diketene-acetone adduct, such as 2,2,6-trimethyl-4H-1,3-dioxin-4-one. The reaction between the hydroxyl-groups and the diketene or diketene-acetone adduct may take place prior to the addition of the cross-linking reagent having amino functionality used for curing.

The cross-linking reagents preferably have an average functionality equal to or greater than 2. Suitable cross-linking reagents having amino functionality include, but are not limited to, polyetheramines, polyamines, and polyamides, and mixtures of two or more thereof. Specific polyetheramines that may be employed in the present invention include Jeffamine® T-3000 and T-403 manufactured by Huntsman Petrochemical Corporation. Specific polyamines may include ethylenediamine, diethylenetriamine, triethylenetetramine, tetraethylenepentamine, pentaethylenehexamine, hexamethylenediamine, methylpentamethylenediamine, trimethylhexanediamine, metaxylenediamine, spriro-acetal diamines, 1,3-[bisaminomethyl]-cyclohexane, tricyclodecanediamine, norbornanediamine, 3,3'-dimethylmethylenedi(cyclohexylamine), methylene-dicyclohexylamine, 1,2-cyclohexanediamine, isophoronediamine, meta-phenylenediamine and bis(hexamethylene)triamine. Polyamides having the following formula may also be used as a suitable cross-linking reagent:

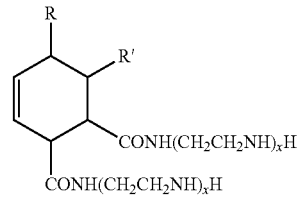

wherein R and R' are independently selected from a residue of a fatty acid and ester of a fatty acid derived from a vegetable or animal source and X and X' are independently a value from about 2 to 50.

VII. Phenol-Termination

The curable polyfarnesenes disclosed herein may also be provided in the form of a phenol-terminated polyfarnesene. In one example, curable polyfarnesenes may be obtained by reacting the polyfarnesene based polyols and blends thereof with phenol in the presence of an acid activated clay catalyst, e.g. a mixture of activated clay and sulfuric acid. The phenols may be unsubstituted, such as phenol, diphenols including Bisphenol A (2,2-diphenol propane) and p,p'-dihydroxy diphenyl, naphthols, anthrol and resorcinol, or the phenols may be substituted, such as halophenols, e.g. chlorophenols, alkyl phenols, e.g., 1-hydroxy-3,5-dimethyl benzene, cresol, and xylenol, and aryl phenols such as p-phenyl phenol.

The reaction may be performed in a heated slurry comprising the polyols and phenols in an organic solvent containing the clay and acid and under an inert atmosphere. A stoichiometric excess of phenol may be utilized and after completion of the reaction, the clay may be removed from the slurry by filtration, for example, and excess phenol removed from the filtrate by distillation, for example.

The resulting phenol-terminated polymers may be combined with epoxy or novolac resins to provide a curable composition.

VIII. Isocyanate Prepolymers

As used herein "polyurethane" refers to a polymer containing one or more urethane bonds and may also include one or more urea bonds. According to certain examples, a composition for making a curable polyurethane resin is provided that comprises one or more polyols, wherein at least one polyol is a polyfarnesene-based polyol, one or more isocyanate-group containing compounds having a functionality of at least 2, and optionally, a chain extender selected from the group consisting of monomeric polyols, polyamines, and combinations thereof.

The amount of at least one polyol and one or more isocyanate-group containing compounds in the composition may be such that the ratio of —NCO groups to —OH groups is about 2:1 to 1:2. The use of NCO/OH ratios lower than unity results in softer, lower modulus materials. At NCO/OH ratio levels above 1.0 lower modulus material may also be prepared. However, these materials will gradually increase in hardness with time since the free NCO groups can undergo further reaction with moisture to give urea structures, or can form allophanate crosslinks (especially at elevated temperatures).

In one particular example, the curable polyurethane resin comprises a polyfarnesene-based polyol having a hydroxyl equivalent weight of 750 to 10000, a chain extender having an equivalent weight of 30 to 200, and one or more isocyanate-group containing compounds having a functionality of at least 2. The resin may be prepared according to various methods.

In a first example of a method, the particular curable polyurethane resin described above may be prepared by first reacting one or more polyols, wherein at least one polyol is a polyfarnesene-based polyol, and at least one chain extender with one or more isocyanate-group containing compounds having a functionality of at least 2 at a NCO/OH ratio of 0.4 to 0.7 to form a stable polyurethane resin. In a second step, an additional amount of the one or more isocyanate-group containing compounds, the one or more polyols, and/or the at least one chain extender is added to the stable polyurethane resin to form a final mixture having an NCO/OH ratio of 0.9 to 1.1 and a final mixture composition wherein the polyols content is 35 to 80% wt. (on solids basis) and the chain extender content is 2 to 17% wt. (on solids basis). The final mixture may be cured to form a crosslinked polyurethane product.

In a second example of a method, the curable polyurethane resin may be prepared by first reacting one or more polyols, wherein at least one polyol is a polyfarnesene-based polyol, and at least one chain extender with one or more isocyanate-group containing compounds having a functionality of at least 2 at a OH/NCO ratio of 0.25 to 0.55 to form a stable polyurethane resin. In a second step, an additional amount of the one or more isocyanate-group containing compounds, the one or more polyols, and/or the at least one chain extender is added to the stable polyurethane resin to form a final mixture having an NCO/OH ratio of 0.9 to 1.1 and wherein the final mixture composition has a polyols content of 35 to 80% wt. (on solids basis) and a chain extender content of 2 to 17% wt. (on solids basis). The final mixture may be cured to form a cross-linked polyurethane product.

In a third example of a method, the curable polyurethane resin may be prepared by first forming a mixture by combining one or more polyols, wherein at least one polyol is a polyfarnesene-based polyol, at least one chain extender, and one or more blocked isocyanate-group containing compounds having a functionality of at least 2 at a NCO/OH ratio of 0.9 to 1.1 and wherein the polyols content is 35 to 80% wt. (on solids basis) and the chain extender content is 2 to 17% wt. (on solids basis). In a second step, the components of the mixture are reacted by heating the mixture at a temperature, e.g. about 80 C to about 150 C, and for a period of time, e.g. about 0.5 hr to about 5 hours, sufficient to partially deblock a portion of isocyanate-group containing compounds, such that a stable partially reacted polyurethane resin is formed. The resin may be cured to a form a cross-linked polyurethane product by again applying sufficient heat for a period of time until all of the remaining isocyanate-group containing compounds are deblocked.

The physical properties of the polyurethane, such as viscosity, may be tailored depending on the desired application for the polyurethane by selection of the molecular weight of the polyols, as well as the ratio of polyfarnesene-based polyols to non-farnesene-based polyols in the compositions described herein. Additional polyols that may also be included in the composition with the polyfarnesene-based polyol include, but are not limited to, poly(oxypropylene) glycol, poly(oxyethylene)glycol, poly(oxypropylene-oxyethylene)glycol, poly(oxytetramethylene)glycol, poly(oxybutylene)glycol, poly(caprolactone)glycol, poly(ethyleneadipate)glycol, poly(butyleneadipate)glycol, aromatic polyester glycols, polybutadiene polyol, hydrogenated polybutadiene polyol, polyisoprene polyol, hydrogenated polyisoprene polyol, and mixtures thereof.

The one or more isocyanate-group containing compounds having a functionality of at least 2 may exhibit several or all of the following characteristics: bulk, symmetry around the isocyanate functional groups, rigid, aromatic, crystalline and high purity. The one or more isocyanate-group containing compounds having a functionality of at least 2 include, but are not limited to, 4,4'-diphenylmethane diisocyanate (MDI), cyclohexanediisocyanate, p-phenylene diisocyanate, 1,5-naphthalene diisocyanate, toluene diisocyanate (TDI), p-xylene diisocyanate, hexamethylene diisocyanate, 4,4'-dicyclohexylmethane diisocyanate, 1,4-bis(isocyanomethyl)-cyclohexane, p-tetramethylxylene diisocyanate, m-tetramethylxylene diisocyanate, isophorone diisocyanate, and mixtures thereof.

The blocked isocyanate-group containing compounds may be the reaction product of one or more of the isocyanate-group containing compounds listed above and a blocking agent. The blocking agent may be selected, such that the isocyanate-group containing compound deblocks at desired temperature, for example at least 80 C. For example, the blocking agent may be selected from the group consisting of caprolactams, phenols, oximes, pyrazoles, malonates, and combinations thereof.

The one or more chain extenders included in the composition may include monomeric polyols and polyamines, for example. The molecular weight of each of the one or more chain extenders may be about 50 to 700. As understood by those of skill in the art, the type and amount of chain extender will affect the elastomeric properties of the polyurethane, such as tensile strength, elongation, and tear resistance values. When the compositions as described herein react to form a polyurethane, the chain extenders contribute to the hard segment of the polyurethane that serve as physical cross-links between the amorphous soft segment domains. The hard segments, which are formed by the reaction between an isocyanate group and either the hydroxyl or amine group of the chain extenders, inhibit plastic flow of softer segments of the polyurethane provided by the long chain polyols. The choice and amount of chain extender may also affect flexural, heat, and chemical resistance properties of the polyurethane. The chain extenders may include, but are not limited to, 1,4-butanediol, 1,6-hexanediol, ethylene glycol, 2-ethyl-1,3-hexanediol (EHD), 2-butyl-2-ethyl-1,3-propanediol (BEPG), 2,2,4-trimethyl-1,3-pentanediol (TMPD), 2,4-diethyl-1,5-pentanediol (PD-9), N,N-diisopropanol aniline, dimethylolpropionic acid, hydroquinone dihydroxyethyl ether (HQEE), diethylene glycol, propylene glycol, trimethylolpropane, glycerol, diethyltoluenediamine (DETDA), 4,4'-methylene bis(2-chloroaniline) (MBCA), ethylenediamine (EDA), dimethylthiotoluene-diamine (DMTTDA), 4,4'-methylenedianiline (MDA), complex of methylenediamine with NaCl (MDA complex), trimethyleneglycol di-p-aminobenzoate (TMGDAB), 4,4'-methylene-bis(3-chloro-2,6-diethylaniline) (M-CDEA), N,N'-bis(sec-butyl)methylene-dianiline (SBMDA), and mixtures thereof.

The polyurethanes made according to the methods disclosed herein may be manufactured by a batch procedure or a continuous procedure. The mixing of the reactants can be accomplished by any of the procedures and apparatus conventional in the art. The individual components are urethane grade and, as such, have low moisture content or are rendered substantially free from the presence of water using conventional procedures, for example, by azeotropic distillation, or by heating under reduced pressure at a temperature in excess of the boiling point of water at the pressure employed. The later procedure is desirable to accomplish degassing of the components.

Preparation of polyurethanes according to the various embodiments disclosed herein may be achieved by procedures conventional in the art for synthesis of polyurethanes. Such procedures include the casting procedure in which the reactants (one or more polyols, one or more diisocyantes, and one or more optional chain extenders) are mixed in the liquid state, either by the one-shot route or the two-step route, also known as the prepolymer technique, and then, the reacting mixture is fabricated into its final form by an appropriate technique such as casting or molding, while the reaction continues by chain extension and/or cross-linking. Final cure is typically achieved by a hot air post-cure for up to twenty-four hours at 25° C. to about 200° C. In general, the reaction of the components limits the subsequent pot life to several minutes, and subsequent casting or molding immediately thereafter. Vacuum degassing may also be used to prepare castings which are bubble free. In the one-shot route, the polyurethane is made by combining all of the components of the composition for making a polyurethane as described herein generally simultaneously into a common reaction vessel. One-shot systems offer the advantages of versatility, simplicity, and low cost fabrication techniques for preparing urethanes having a wide range of physical properties. Such applications as caulks, sealants, elastomers and foams are possible via these systems.

Two-shot systems are based upon the intermediate formulation of a prepolymer which can be further chain-extended with additional polyols and polyamines to form the final polyurethane. These systems may provide higher performance urethanes and have the advantages of lowering the overall toxicity of the system.

In the prepolymer procedure, the one or more isocyanate-group containing compounds are first reacted with the one or more polyols to form a prepolymer. The one or more polyols include at least one polyfarnesene-based polyol. Therefore, the resulting prepolymer is a polymer having a chain derived from farnesene monomer and terminal ends functionalized with one or more isocyanate groups. Additional isocyanate-group containing compounds, polyols, and chain extenders may then be added to the prepolymer to complete formation of the polyurethane.

The methods described herein for making a polyurethane may be either solventless or include a solvent. In the solventless embodiment, the one or more polyols are heated to 70° to 100° C., for example, and then thoroughly mixed with the desired amount of chain extender for at least two hours under nitrogen flow to eliminate moisture. Isocyanate containing compounds are then added to the mixture immediately prior to pouring the mixture into a heated mold, desirably treated with a mold release compound. The polyurethane composition is formed by curing into the mold for several hours and then postcuring above 110° C. for at least 2 hours. In the solvent method, the one or more polyols are dissolved in a solvent, such as dry toluene, heated to about 70° to 100° C., for example, and then mixed with the desired type and amount of the one or more isocyanate-containing compounds and chain extenders for at least 2 hours under nitrogen flow. The solvent is then removed by evaporation, for example, and then the composition is postcured for at least 2 hours at 110° C. while under vacuum. The thermoplastic polyurethane composition can then be heat pressed above the elastomer melting point to form an elastomeric polyurethane article.

The compositions for making a polyurethane, in addition to including one or more polyols, isocyanate-containing compounds, and chain extenders may also include reinforcing additives, asphalt, and process oils to alter the physical characteristics of the polyurethane composition and/or reduce costs.

Plasticizers may be included as extenders that also increase the softness and flexibility of the cured material in various embodiments of the disclosed methods and compositions. One or more plasticizers may be selected from the group consisting of vegetable oil, mineral oil, soybean oil, terpene resins, aromatic esters (e.g. dioctyl phthalate, diundecyl phthalate, tricresyl phosphate, and triisononyl mellitate), linear esters (e.g. di-tridecyl adipate), chlorinated Paraffin, aromatic and napthenic process oils, alkyl naphthalenes, and low molecular weight polyisoprene, polybutadiene, or polybutylene resins. The amounts of plasticizer employed in the composition can vary from 0 to about 500 phr (per hundred parts of polyurethane), between about 0 to about 100 phr, or between about 0 and about 60 phr.

Because of their hydrocarbon backbones, the polyurethanes made according to the methods and compositions described herein are compatible with conventional hydrocarbon oils, chlorinated oils, asphalts and other related low cost extending materials. The quantity of asphalt or process oil which may be incorporated depends on the type of oils, the amount of isocyanate groups present, and the type of fillers, if present. Cured polyurethanes may be formulated which incorporate in excess of 100 parts extending material per 100 parts of polyurethane and do not "bleed" oil from the final product. The cured polyurethanes may also exhibit a moderate decrease in tensile strength and modulus and improved elongation with the addition of an extending material. Oil extension may also improve hydrolytic stability, control of premix viscosities, pot life, gel time, cure time, and the ability to attain higher filler loading. The use of materials such as chlorinated waxes and oils also provides fire retardant properties to the finished product.

Suitable fillers include, but are not limited to, carbon black, calcium carbonate, clays, talcs, zinc oxide, titanium dioxide, silica and the like. Calcium carbonates are relatively soft and may be used at rather high levels to enhance the extrusion properties of the polyurethane compositions described herein. Elastomers prepared using calcium carbonates are suitable for many caulk and sealant applications where high elongation and moderate tensile properties are required. Clays may provide a moderate degree of reinforcement, fair abrasion resistance, but a relatively high stiffening effect. Clays are used as fillers in stocks requiring hardness and high modulus; e.g., shoe soles and heels, mats, and floor tiles. Zinc oxide may also provide resilience and heat conductivity, but its use as a reinforcing filler may be limited due to high density and cost. Zinc oxide may be effectively employed as a reinforcing filler in conjunction with carbon black to increase tensile, modulus, tear, and hardness, and abrasion resistance. It is important to note that at a constant carbon black level, increasing the concentration of zinc oxide may decrease the workable pot life of the compositions described herein after the isocyanate component is added; i.e., gelation occurs more rapidly. Silicas contribute a greater increase in tensile strength than other non-carbon black fillers. Silicas also have a profound stiffening effect on the compositions described herein. The amount of filler usually is in the range of 0 to about 800 phr, depending on the type of filler used and on the application for which the formulation is intended. Preferred fillers are silica and titanium dioxide. The filler should be thoroughly dried in order that adsorbed moisture will not interfere with the reaction between the isocyanate-containing compounds and the one or more polyols.

Stabilizers known in the art may also be incorporated into the composition. For example, adhesive formulations that utilize the polyurethanes of the disclosed methods and compositions may include stabilizers for protection during the life of the sealant or adhesive against, for example, oxygen, ozone and ultra-violet radiation. The stabilizers may also prevent thermo-oxidative degradation during elevated temperature processing. Antioxidants and UV inhibitors which interfere with the urethane curing reaction should be avoided. Preferred antioxidants are sterically hindered phenolic compounds, like butylated hydroxy toluene. Preferred UV inhibitors are UV absorbers such as benzotriazole compounds. The amount of stabilizer in the formulation will depend greatly on the intended application of the product. If processing and durability requirements are modest, the amount of stabilizer in the formulation will be less than about 1 phr. However depending on the intended use of the polyurethane, the stabilizer concentration may be as much as about 10 phr.

The polyurethane according to the embodiments of the disclosed methods and compositions may be cured by procedures known by those having ordinary skill in the art for the curing of isocyanate terminated polymers. Curing mechanisms include, but are not limited to, the use of moisture, blocked amines, oxazolidines, epoxies, triisocyanurate ring formation, allophonate and biruet crosslinking and the like. Unfilled urethane systems may be cured at ambient temperatures, but cure rates may be accelerated by using either typical urethane catalysts and/or elevated temperatures. Catalysts include, but are not limited to, dibutyltin dilaurate and 1,4-diazo [2.2.2] bicyclooctane. The amount and type of catalyst that may be included in the compositions described herein may be selected based on the desired cure rate. Dependent upon the curing technology employed, the resulting polyurethanes may be either a thermoset polyurethane or a higher melt temperature thermoplastic polyurethane once curing is accomplished.

The polyurethanes obtained according to the various embodiments of the disclosed methods and compositions exhibit excellent chemical and physical properties.

EXAMPLES

Some of the disclosed methods and compositions are further described using the following non-limiting examples.

Polyfarnesene Diol Synthesis

For the polymerization, dilithiobutane initiator/MTBE solution was transferred to a reactor and a desired amount of farnesene monomer for a target molecular weight was added to the reactor. The polymerization reaction was done at 25-40° C. for various times depending on the molecular weight and terminated with an excess of propylene oxide (PO/Li=5) and degassed DEMI water for hydrolysis followed by addition of BHT as an antioxidant. The final solution was washed with water until no alkalinity is achieved. The organic phase was separated from water phase and then solvent was removed by steam stripping under nitrogen atmosphere.

Table 1 provides a list of the materials used for preparing the formulations of the following examples and comparative examples.

TABLE 1

| Material | Description | Eq. Wt |
|---|---|---|
| Krasol ® LBH 2000 LO (polybutadiene diol) | 0.812 meq/g OH value (27-74) | 1232 |
| Krasol ® HLBH P-2000 (hydrogenated polybutadiene diol) | 0.83 meq/g OH value | |
| Poly bd ® R45-HTLO (polybutadiene diol) | 0.84 meq/g OH value | |
| Polyfarnesene diol (Mw = 2000) | 1.019 meq/g OH value (27-74) | 981 |
| 2-ethyl-1,3-hexanediol | EHD, | 73.12 |
| 2,4' Diphenylmethane Diisocyanate (Lupranate ® MI) | 33.5% NCO content | 125.4 |
| Dibutyltin dilaurate | T-12 | |
| Dibutyl phthalate | DBP | |

Evaluation of Effect of Polyol Blends and Isocyanate Content

The effect of blending a polyfarnesene diol and polybutadiene diol and reacting the various blends with increasing amounts of a diisocyanate were evaluated. In Comparative Examples 1-3, only polybutadiene diols were used. In Examples 1-6, blends of polybutadiene diol and polyfarnese diols were used. Viscosity of the polyurethane prepolymers was measured at 25° C., and NCO group content was monitored by identifying the intensity of NCO group absorbance peaks at 2265 cm$^{-1}$ on IR during prepolymer preparation at 60° C. for 3 hours. The results are provided in Tables 2, 3, and 4.

TABLE 2

| | Comp. Ex. 1 | Ex. 1 | Ex. 2 |
|---|---|---|---|
| Krasol ® LBH 2000 LO | 100 | 75 | 50 |
| Polyfarnesene diol | 0 | 25 | 50 |
| 2,4' Diphenylmethane Diisocyanate | 19.95 | 20.09 | 20.24 |
| Free NCO % in final prepolymer by wt % | 2.72 | 2.58 | 2.43 |

TABLE 2-continued

|  | Comp. Ex. 1 | Ex. 1 | Ex. 2 |
|---|---|---|---|
| Viscosity of prepolymer at 25° C., cps | | | |
| At initial time of prepolymerization | 3437 | 2230 | 1398 |
| At reacted 3 hrs of polymerization | Off scale | 241000 | 131000 |
| NCO content from intensity at 2265/cm on FTIR | | | |
| At initial time of prepolymerization | 0.1978 | 0.2074 | 0.2137 |
| At reacted 3 hrs of polymerization | 0.0950 | 0.0927 | 0.0911 |

TABLE 3

|  | Comp. Ex. 2 | Ex. 3 | Ex. 4 |
|---|---|---|---|
| Krasol ® LBH 2000 LO | 100 | 75 | 50 |
| Polyfarnesene diol | 0 | 25 | 50 |
| 2,4' Diphenylmethane Diisocyanate | 31.49 | 31.63 | 31.79 |
| Free NCO % in final prepolymer by wt % | 5.42 | 5.28 | 5.15 |
| Viscosity of prepolymer at 25° C., cps | | | |
| At initial time of prepolymerization | 2007 | 1299 | 870 |
| At reacted 3 hrs of polymerization | 69360 | 39492 | 22620 |
| NCO content from intensity at 2265/cm on FTIR | | | |
| At initial time of prepolymerization | 0.2976 | 0.2962 | 0.2982 |
| At reacted 3 hrs of polymerization | 0.2001 | 0.1985 | 0.1969 |

TABLE 4

|  | Comp. Ex. 3 | Ex. 5 | Ex. 6 |
|---|---|---|---|
| Krasol ® LBH 2000 LO | 100 | 75 | 50 |
| Polyfarnesene diol | 0 | 25 | 50 |
| 2,4' Diphenylmethane Diisocyanate | 46.19 | 46.33 | 46.48 |
| Free NCO % in final prepolymer by wt % | 8.24 | 8.12 | 7.99 |
| Viscosity of prepolymer at 25° C., cps | | | |
| At initial time of prepolymerization | 1119 | 721 | 545 |
| At reacted 3 hrs of polymerization | 19371 | 10685 | 7264 |
| NCO content from intensity at 2265/cm on FTIR | | | |
| At initial time of prepolymerization | 0.3821 | 0.3827 | 0.3852 |
| At reacted 3 hrs of polymerization | 0.3048 | 0.3057 | 0.3063 |

Based on the results in Tables 2-4, increased polyfarnesene diol in the polyol blends resulted in a lower viscosity of the resulting polyurethane prepolymer.

Similar viscosity results, provided in Tables 5, 6, and 7 were exhibited by various blends of polyfarnesene diols with polybutadiene diols. The viscosity of the blends decreases with the increased amount of polyfarnesene diol in the blends.

TABLE 5

| Polyfarnesene diol | | 100 | 75 | 50 | 25 | 0 |
|---|---|---|---|---|---|---|
| Polybd R45HTLO | | 0 | 25 | 50 | 75 | 100 |
| Brookfield viscosity, cps | 25° C. | 1289 | 1828 | 2757 | 4187 | 6467 |
|  | 40° C. | 427 | 666 | 1060 | 1687 | 2663 |
|  | 60° C. | 142 | 236 | 398 | 652 | 1045 |
|  |  | | miscible | miscible | miscible | |

TABLE 6

| Polyfarnesene diol | | 100 | 75 | 50 | 25 | 0 |
|---|---|---|---|---|---|---|
| Krasol LBH 2000 | | 0 | 25 | 50 | 75 | 100 |
| Brookfield viscosity, cps | 25° C. | 1289 | 2128 | 3609 | 6186 | 10623 |
|  | 40° C. | 427 | 668 | 1035 | 1629 | 2605 |
|  | 60° C. | 142 | 205 | 299 | 434 | 631 |
|  |  | | miscible | miscible | miscible | |

TABLE 7

| Polyfarnesene diol | | 100 | 75 | 50 | 25 | 0 |
|---|---|---|---|---|---|---|
| Krasol HLBH 2000 | | 0 | 25 | 50 | 75 | 100 |
| Brookfield | 25° C. | 1289 | 2820 | 6452 | 15216 | 36492 |

TABLE 7-continued

| viscosity, cps | 40° C. | 427 | 863 | 1804 | 3819 | 8748 |
|---|---|---|---|---|---|---|
| | 60° C. | 142 | 254 | 473 | 892 | 1831 |
| | | | miscible | miscible | miscible | |

Evaluation of Physical Properties

The polyfarnesene diol (Mw=2000) was used, either by itself or blended with polybutadiene polyol, to prepare various samples of cured polyurethane plaques for evaluation. The polyurethanes were prepared from blends that also used various concentrations of a chain extender, ethyl hexanediol (EHD), and a diisocyanate 2,4' Diphenylmethane Diisocyanate (Lupranate® MI).

The polyurethanes were prepared by the one shot procedure. Polyols and chain extenders were combined in a flask and mixed under nitrogen at ambient temperature followed by the addition of isocyanate and immediately pouring the mixture into a heated mold. The final curing was performed in an oven and held at 85° C. for 5 hours and overnight at 60° C. Each sample sheet was post cured for one week at room temperature before testing of its physical properties. Relative parameters were tested by referring to ASTM D412, ASTM D624 Die C, and using DSC, Shore type Durometers, a Brookfield viscometer, and an EJA Vantage-10 tensile tester and the results provided in Tables 8, 9, and 10.

TABLE 8

| | Comp. Ex. A1 | A2 | A3 | A4 |
|---|---|---|---|---|
| Krasol LBH 2000 LO | 100 | 75 | 50 | 0 |
| Polyfarnesene diol | 0 | 25 | 50 | 100 |
| 2-ethyl-1,3-hexanediol | 5.34 | 5.05 | 4.75 | 4.10 |
| 2,4' Diphenylmethane Diisocyanate | 19.95 | 20.09 | 20.24 | 20.42 |
| 20% T-12 solution in DBP, drops | 4 | 4 | 4 | 4 |
| Hard segment content, wt % | 20.19 | 20.09 | 19.99 | 19.69 |
| Hardness of PU, Shore A | 54 | 47 | 38 | 55* |
| Tensile strength, psi | 337 | 267 | No data** | No data*** |
| Elongation at break, % | 885 | 680 | >1250 | No data*** |
| Modulus, psi | 109 | 95 | 41 | No data*** |
| Tear strength, lbf/in | 98 | 74 | 33 | No data*** |
| Tg of polyurethane product, ° C. | −28.3 | −33.4 | −39.8 | −51.2 |

55* the hardness was tested by type Shore 00 Durometer
No data** data could not be obtained due to specimen were not broken after strain was over 1200%
No data*** for sample A4, it is too soft and tacky to be tested

TABLE 9

| | Comp. Ex. B1 | B2 | B3 | B4 |
|---|---|---|---|---|
| Krasol LBH 2000 LO | 100 | 75 | 50 | 0 |
| Polyfarnesene diol | 0 | 25 | 50 | 100 |
| 2-ethyl-1,3-hexanediol | 11.87 | 11.58 | 11.28 | 10.81 |
| 2,4' Diphenylmethane Diisocyanate | 31.49 | 31.63 | 31.79 | 32.28 |
| 20% T-12 solution in DBP, drops | 4 | 5 | 5 | 4 |
| Hard segment content, wt % | 30.24 | 30.17 | 30.10 | 30.11 |
| Hardness of PU, Shore A | 72 | 66 | 60 | 55 |
| Tensile strength, psi | 1920 | 1029 | 742 | 572 |
| Elongation at break, % | 584 | 468 | 479 | 412 |
| Modulus, psi | 494 | 332 | 228 | 164 |
| Tear strength, lbf/in | 269 | 214 | 172 | 109 |
| Tg of polyurethane product, ° C. | −28.0 | −31.0 | −36.6 | −47.5 |

TABLE 10

| | Comp. Ex. C1 | C2 | C3 | C4 |
|---|---|---|---|---|
| Krasol LBH 2000 LO | 100 | 75 | 50 | 0 |
| Polyfarnesene diol | 0 | 25 | 50 | 100 |
| 2-ethyl-1,3-hexanediol | 20.19 | 19.89 | 19.59 | 19.01 |
| 2,4' Diphenylmethane Diisocyanate | 46.19 | 46.33 | 46.48 | 46.77 |
| 20% T-12 solution in DBP, drops | 4 | 5 | 5 | 4 |
| Hard segment content, wt % | 39.90 | 39.84 | 39.78 | 39.68 |
| Hardness of PU, Shore A | 83 | 75 | 73 | 71 |
| Tensile strength, psi | 2188 | 1350 | 1125 | 982 |
| Elongation at break, % | 491 | 291 | 328 | 347 |
| Modulus, psi | 860 | 681 | 527 | 378 |
| Tear strength, lbf/in | 392 | 332 | 280 | 174 |
| Tg of polyurethane product, ° C. | −26.6 | −29.9 | −33.0 | −45.9 |

While increased concentrations of polyfarnesene diol in the polyol blend resulted in lower hardness and tensile strength in the cured samples, the higher concentration of chain extender substantially improved the physical properties of all samples. Therefore, the appropriate selection of the type and amount of chain extender should provide a polyurethane prepolymer derived from a substantial amount of polyfarnesene diol with both improved viscosity prior to curing and adequate physical properties upon curing.

Tables 11 to 16 below provide data associated with the physical properties of polyurethane samples prepared using the two-shot method. Polyols and isocyantes were reacted together to a form a prepolymer at approximately 80° C. for about three hours followed by the addition of chain extenders, such that the final polyurethane had an NCO/OH ratio of approximately 1.0. The final curing was performed in an oven and held at 85° C. for 5 hours and overnight at 60° C.

For the samples of Examples D3-8, E3-8, and F3-8, polyfarnesene diol (Mw=5000) was evaluated having a higher molecular weight than the polyfarnesene diol (Mw=2000) of Examples G3-8, H3-8, and I3-8. Each sample sheet was post cured for one week at room temperature before testing of its physical properties. Relative parameters were tested by referring to ASTM D412, ASTM D624 Die C, and using DSC, Shore type Durometers, a Brookfield viscometer, and an EJA Vantage-10 tensile tester and the results provided in Tables 11 to 16.

TABLE 11

|  | Comp. Ex. | | Example | | Example | | Example | |
| --- | --- | --- | --- | --- | --- | --- | --- | --- |
|  | D1 | D2 | D3 | D4 | D5 | D6 | D7 | D8 |
| Krasol ® LBH 2000 LO | 100 | 100 | 75 | 75 | 50 | 50 | 0 | 0 |
| Polyfarnesene diol | 0 | 0 | 25 | 25 | 50 | 50 | 100 | 100 |
| 2-ethyl-1,3-hexanediol | 11.80 |  | 12.30 |  | 12.80 |  | 13.80 |  |
| 2,2,4-trimethyl-1,3-pentanediol |  | 11.80 |  | 12.30 |  | 12.80 |  | 13.80 |
| 2,4' Diphenylmethane Diisocyanate | 31.09 | 31.09 | 30.57 | 30.57 | 30.06 | 30.06 | 29.03 | 29.03 |
| 20% T-12 in DBP, drop | 3 | 3 | 3 | 3 | 3 | 3 | 3 | 3 |
| Shore A/D hardness | 73/28 | 76/31 | 72/30 | 74/30 | 71/27 | 71/27 | 55/16 | 49/12 |
| Tg, ° C. | −29.0 | −28.5 | −37.0 | −38.6 | −48.9 | −47.3 | −60.6 | −62.4 |
| Modulus, psi | 339 | 372 | 474 | 387 | 442 | 452 | 171 | 121 |
| Tensile strength, psi | 1136 | 675 | 1508 | 641 | 1507 | 816 | 657 | 447 |
| Elongation at break, % | 862 | 779 | 730 | 634 | 665 | 526 | 473 | 744 |
| Tear resistance, lbf/in | 238 | 205 | 275 | 213 | 248 | 212 | 121 | 104 |

TABLE 12

|  | Comp. Ex. | | Example | | Example | | Example | |
| --- | --- | --- | --- | --- | --- | --- | --- | --- |
|  | E1 | E2 | E3 | E4 | E5 | E6 | E7 | E8 |
| Krasol ® LBH 2000 LO | 100 | 100 | 75 | 75 | 50 | 50 | 0 | 0 |
| Polyfarnesene diol | 0 | 0 | 25 | 25 | 50 | 50 | 100 | 100 |
| 2-ethyl-1,3-hexanediol | 20.40 |  | 21.00 |  | 21.63 |  | 22.50 |  |
| 2,2,4-trimethyl-1,3-pentanediol |  | 20.40 |  | 21.00 |  | 21.63 |  | 22.50 |
| 2,4' Diphenylmethane Diisocyanate | 46.17 | 46.17 | 45.82 | 45.82 | 45.54 | 45.54 | 44.28 | 44.28 |
| 20% T-12 in DBP, drops | 3 | 3 | 3 | 3 | 3 | 3 | 3 | 3 |
| Shore A/D hardness | 91/48 | 91/44 | 87/42 | 86/40 | 82/38 | 83/35 | 66/21 | 63/18 |
| Tg, ° C. | −26.8 | −30.0 | −36.6 | −40.8 | −45.5 | −46.1 | −62.1 | −61.5 |
| Modulus, psi | 1163 | 1146 | 1118 | 1068 | 1043 | 977 | 387 | 323 |
| Tensile strength, psi | 2106 | 1347 | 1976 | 1345 | 1671 | 1191 | 602 | 520 |
| Elongation at break, % | 452 | 383 | 453 | 399 | 343 | 272 | 200 | 314 |
| Tear resistance, lbf/in | 464 | 378 | 404 | 369 | 351 | 283 | 116 | 110 |

TABLE 13

|  | Comp. Ex. | | Example | | Example | | Example | |
| --- | --- | --- | --- | --- | --- | --- | --- | --- |
|  | F1 | F2 | F3 | F4 | F5 | F6 | F7 | F8 |
| Krasol ® LBH 2000 LO | 100 | 100 | 75 | 75 | 50 | 50 | 0 | 0 |
| Polyfarnesene diol | 0 | 0 | 25 | 25 | 50 | 50 | 100 | 100 |
| 2-ethyl-1,3-hexanediol | 32.60 |  | 33.10 |  | 33.60 |  | 34.60 |  |
| 2,2,4-trimethyl-1,3-pentanediol |  | 32.60 |  | 33.10 |  | 33.60 |  | 34.60 |
| 2,4' Diphenylmethane Diisocyanate | 67.55 | 67.55 | 67.03 | 67.03 | 66.52 | 66.52 | 65.49 | 65.49 |
| 20% T-12 solution in DBP, drops | 3 | 3 | 3 | 3 | 3 | 3 | 3 | 3 |
| Shore A/D hardness | 95/58 | 96/57 | 92/52 | 94/48 | 82/39 | 89/42 | 72/19 | 68/18 |
| Tg, ° C. | −31.3 | −29.2 | −41.5 | −38.6 | −50.3 | −49.2 | −62.9 | −62.2 |
| Modulus, psi | 2160 | 2099 | 1841 | 1784 | 1581 | 1400 | 258 | No data |
| Tensile strength, psi | 3093 | 2207 | 2305 | 1851 | 1834 | 1449 | 262 | 242 |
| Elongation at break, % | 429 | 290 | 338 | 232 | 231 | 186 | 133 | 88 |
| Tear resistance, lbf/in | 627 | 561 | 498 | 463 | 362 | 283 | 80 | 64 |

TABLE 14

|  | Comp. Ex. | | Example | | Example | | Example | |
| --- | --- | --- | --- | --- | --- | --- | --- | --- |
|  | G1 | G2 | G3 | G4 | G5 | G6 | G7 | G8 |
| Krasol ® LBH 2000 LO | 100 | 100 | 75 | 75 | 50 | 50 | 0 | 0 |
| Polyfarnesene diol | 0 | 0 | 25 | 25 | 50 | 50 | 100 | 100 |
| 2-ethyl-1,3-hexanediol | 11.80 |  | 11.60 |  | 11.40 |  | 11.00 |  |
| 2,2,4-trimethyl-1,3-pentanediol |  | 11.80 |  | 11.60 |  | 11.40 |  | 11.00 |
| 2,4' Diphenylmethane Diisocyanate | 31.09 | 31.09 | 31.29 | 31.29 | 31.51 | 31.51 | 31.91 | 31.91 |
| 20% T-12 in DBP, drops | 3 | 3 | 3 | 3 | 3 | 3 | 3 | 3 |
| Shore A/D hardness | 73/28 | 76/31 | 69/26 | 68/23 | 66/19 | 62/20 | 58/15 | 57/15 |
| Tg, ° C. | −29.0 | −28.5 | −32.6 | −33.5 | −38.8 | −37.3 | −55.5 | −49.7 |
| Modulus, psi | 339 | 372 | 320 | 274 | 219 | 212 | 98 | 68 |
| Tensile strength, psi | 1136 | 675 | 1267 | 635 | 1048 | 560 | 577 | 314 |
| Elongation at break, % | 862 | 779 | 833 | 728 | 939 | 760 | 903 | 866 |
| Tear resistance, lbf/in | 238 | 205 | 211 | 202 | 157 | 142 | 77 | 64 |

TABLE 15

|  | Comp. Ex. | | Example | | Example | | Example | |
| --- | --- | --- | --- | --- | --- | --- | --- | --- |
|  | H1 | H2 | H3 | H4 | H5 | H6 | H7 | H8 |
| Krasol ® LBH 2000 LO | 100 | 100 | 75 | 75 | 50 | 50 | 0 | 0 |
| Polyfarnesene diol | 0 | 0 | 25 | 25 | 50 | 50 | 100 | 100 |
| 2-ethyl-1,3-hexanediol | 20.40 |  | 20.20 |  | 20.00 |  | 19.60 |  |
| 2,2,4-trimethyl-1,3-pentanediol |  | 20.40 |  | 20.20 |  | 20.00 |  | 19.60 |
| 2,4' Diphenylmethane Diisocyanate | 46.17 | 46.17 | 46.37 | 46.37 | 46.58 | 46.58 | 46.98 | 46.98 |
| 20% T-12 in DBP, drops | 3 | 3 | 3 | 3 | 3 | 3 | 3 | 3 |
| Shore A/D hardness | 91/48 | 91/44 | 88/41 | 88/40 | 82/36 | 88/39 | 84/35 | 84/37 |
| Tg, ° C. | −26.8 | −30.0 | −33.9 | −34.3 | −39.0 | −40.2 | −48.11 | −50.46 |
| Modulus, psi | 1163 | 1146 | 1059 | 1026 | 801 | 830 | 687 | 714 |
| Tensile strength, psi | 2106 | 1347 | 1869 | 1586 | 1659 | 1291 | 1477 | 1027 |
| Elongation at break, % | 452 | 383 | 460 | 490 | 548 | 483 | 514 | 396 |
| Tear resistance, lbf/in | 464 | 378 | 395 | 385 | 346 | 326 | 260 | 240 |

TABLE 16

|  | Comp. Ex. | | Example | | Example | | Example | |
| --- | --- | --- | --- | --- | --- | --- | --- | --- |
|  | I1 | I2 | I3 | I4 | I5 | I6 | I7 | I8 |
| Krasol ® LBH 2000 LO | 100 | 100 | 75 | 75 | 50 | 50 | 0 | 0 |
| Polyfarnesene diol | 0 | 0 | 25 | 25 | 50 | 50 | 100 | 100 |
| 2-ethyl-1,3-hexanediol | 32.50 |  | 32.30 |  | 32.10 |  | 31.70 |  |
| 2,2,4-trimethyl-1,3-pentanediol |  | 32.50 |  | 32.30 |  | 32.10 |  | 31.70 |
| 2,4' Diphenylmethane Diisocyanate | 67.38 | 67.38 | 67.58 | 67.58 | 67.79 | 67.79 | 68.19 | 68.19 |
| 20% T-12 in DBP, drop | 3 | 3 | 3 | 3 | 3 | 3 | 3 | 3 |
| Shore A/D hardness | 95/58 | 96/57 | 92/49 | 95/53 | 95/48 | 85/48 | 96/55 | 95/52 |
| Tg, ° C. | −31.3 | −29.2 | −35.9 | −34.5 | −36.7 | −41.3 | −62.1 | −63.6 |
| Modulus, psi | 2160 | 2099 | 1955 | 1915 | 1824 | 1710 | 1623 | 1557 |
| Tensile strength, psi | 3093 | 2207 | 2415 | 2133 | 3230 | 1761 | 2355 | 1669 |
| Elongation at break, % | 429 | 290 | 314 | 280 | 425 | 235 | 329 | 203 |
| Tear resistance, lbf/in | 627 | 561 | 564 | 542 | 527 | 471 | 427 | 420 |

Similar to the samples obtained by the one-shot procedure, increased concentrations of polyfarnesene diol in the polyol blend resulted in lower hardness and tensile strength in the cured samples. The use of 2-ethyl-1,3-hexanediol instead of 2,2,4-trimethyl-1,3-pentanediol provided improved physical properties of all samples suggesting that the appropriate selection of the type and amount of chain extender may counter the effects of increasing the concentration of farnesene-based soft segments in the polyurethane.

B1, B2, B3, and B4 were prepared by the one shot procedure and had a hard segment content (chain extender plus diisocyanate) based on the total weight of the composition of about 30 wt %. G1, G3, G5, and G7 also had a hard segment content of about 30 wt %, but were produced by the two-shot method. G1, G3, G5, and G7 exhibited a slightly improved tensile strength. Increasing the hard segment content generally improved overall physical performance. For example, compare C1, C2, C3, and C4 with H1, H3, H5, and H7, which all have a hard segment content of about 40 wt. %.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element. The terms "and" and "or" may have both conjunctive and disjunctive meanings.

Unless otherwise stated, any and all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

We claim:

1. A curable composition comprising an amine-terminated polyfarnesene and one or more isocyanate-group containing compounds, the one or more isocyanate-group containing compounds having an isocyanate group functionality of at least two and the amine-terminated polyfarnesene comprising:
   a hydrophobic polymer chain derived from at least one monomer comprising farnesene; wherein the amine-terminated polyfarnesene is obtained by:
      combining one or more polyols comprising a polyfarnesene polyol having terminal hydroxyl groups with a base to form a mixture;
      adding acrylonitrile to the mixture to form a reaction mixture;
      reacting the reaction mixture via Michael Addition of the acrylonitrile to the terminal hydroxyl groups to form a cyanoalkylated polymer having terminal cyanoalkylate groups; and
      hydrogenating the terminal cyanoalkylate groups in the presence of anhydrous ammonia to form the amine-terminated polyfarnesene;
   wherein the curable composition produces a polymer having a backbone derived from the monomers comprising farnesene.

2. The composition of claim 1, wherein the at least one monomer further comprises at least one co-monomer selected from the group consisting of dienes and vinyl aromatics.

3. The composition of claim 1, wherein the at least one monomer further comprises at least one co-monomer selected from the group consisting of butadiene, isoprene, and styrene.

4. The curable composition of claim 1, wherein the hydrophobic polymer chain derived from at least one monomer comprising farnesene has a number average molecular weight less than or equal to 100,000 g/mol.

5. The curable composition of claim 1, wherein the hydrophobic polymer chain derived from at least one monomer comprising farnesene has a number average molecular weight less than or equal to 25,000 g/mol.

6. The curable composition of claim 1, wherein the hydrophobic polymer chain derived from at least one monomer comprising farnesene has a viscosity at 25° C. less than 10,000 cP.

7. The curable composition of claim 1, wherein the hydrophobic polymer chain derived from at least one monomer comprising farnesene has been hydrogenated to have a degree of unsaturation that is less than or equal to 50% of the degree of unsaturation of the farnesene-based polyol prior to hydrogenation.

8. The curable composition of claim 1, wherein the hydrophobic polymer chain derived from at least one monomer comprising farnesene has been hydrogenated to have a degree of unsaturation that is less than or equal to 10% of the degree of unsaturation of the farnesene-based polyol prior to hydrogenation.

* * * * *